United States Patent
Valle

[15] 3,664,006
[45] May 23, 1972

[54] TOOL FOR ATTACHING SINKERS TO A FISHING LINE

[72] Inventor: Thomas Valle, Carbondale, Colo.

[73] Assignees: Ralph R. Crandell; Albert G. W. Hack, Denver, Colo., part interest to each

[22] Filed: June 29, 1970

[21] Appl. No.: 50,681

[52] U.S. Cl. .........................................................29/212 D
[51] Int. Cl............................................................B23q 7/10
[58] Field of Search...................29/212 D, 212, 200 H, 203 H

[56] References Cited

UNITED STATES PATENTS 2,941,431   6/1960   Christensen .........................29/212 D
3,371,400   3/1968   Edes .....................................29/212 D Primary Examiner—Thomas H. Eager
Attorney—Drake and Crandell

[57] ABSTRACT

The sinker attaching tool disclosed includes a pair of handles pivoted together with a clamping head on one end of one of the handles. The other handle includes a magazine bore for receiving a strip of sinker weight stock. The stock includes a plurality of integrally joined split weight segments. One of the segments is placed beneath the clamping head and a fishing line placed in the split. Operation of the tool clamps the split weight segment onto a fishing line and severs the segment from the bar stock.

2 Claims, 12 Drawing Figures

Patented May 23, 1972

3,664,006

INVENTOR
THOMAS VALLE
BY
Drake & Crandell
ATTORNEYS 3,664,006

TOOL FOR ATTACHING SINKERS TO A FISHING LINE

BACKGROUND OF THE INVENTION

The present invention relates to a tool for attaching split shot type weights to a fishing line, and to a magazine strip of weight stock therefor.

It is an ancient and well known procedure to attach split shot to a fishing line by selecting an individual shot and clamping it to a fishing line by using a pair of pliers. This procedure, though widely used, is cumbersome particularly when the fisherman must hold the pole and line, select a shot and manipulate the pliers. Difficulties in such a procedure are increased during cold weather, or when the fisherman is in a cramped location or is wading in the middle of a stream. Various tools have been suggested for the purpose of attaching single shot from a loose supply of shot pellets. U.S. Pat. No. 3,371,400, issued to G. O. Edes, on Mar. 5, 1968, for "Split Shot Applicator and Magazine" describes a tool for attaching split shot to a fishing line, which utilizes a strip of paper or cardboard having secured thereon a series of individual split shot pellets.

OBJECTS OF THE INVENTION

It is the principal object of the present invention to provide an improved tool for attaching deformable metal weights or sinkers to a fishing line, which is rugged, easy to handle and as simple to operate as a pair of pliers, a nutcracker, or scissors.

Another object is to provide a tool of the foregoing character which is adapted to receive sinker weight stock in the convenient form of a continuous strip of material.

A further object of the present invention is to provide a tool of the foregoing character which is easy to load, is not critical in its operation, and in which, when loaded, a sinker weight segment is always available for receiving a fishing line so that a weight can be quickly attached to the fishing line with a minimum of trouble and inconvenience.

A related object is to provide a tool of the foregoing character which can be readily operated by a fisherman wearing gloves, in cold weather, and while holding a pole and the line.

SUMMARY OF THE INVENTION

The foregoing objects are accomplished in a tool for attaching deformable metal weights to a fishing line as herein described. The tool comprises a pair of handles which are pivoted together, one of said handles carrying a bifurcated clamping and cutting head adjacent one end. The head defines a generally V-shaped notch having opposed legs, one leg of the head having a sharpened cutting edge thereon. The second one of the handles has a transverse slot defined adjacent one end thereof for operatively receiving the clamping and cutting head on the other handle when the handles are actuated to move the operative ends together in plier-like fashion. The transverse slot defines a bottom wall forming an anvil surface and a sidewall forming a stop surface adjacent the free end of the handle. The second handle further includes an elongated bore extending therethrough and opening into the slot. An access opening and closure cover is provided at the handle end of the bore. The bore is adapted to receive sinker weight stock in the form of a strip. A coil spring is provided within the handle bore for feeding the weight stock towards the anvil slot. The weight stock is formed of a plurality of split sinker weight segments integrally joined to form an elongated bar or strip. A single segment is urged into the slot by the spring with the split in position for receiving a fishing line. The tool is then actuated and the clamping head squeezes the split shot onto the line and simultaneously severs it from the bar stock. When the tool handle is released, the line may be removed with the weight attached and a new shot segment is automatically positioned in the slot for receiving a fishing line.

DESCRIPTION OF THE PREFERRED EMBODIMENT

Figure 1:
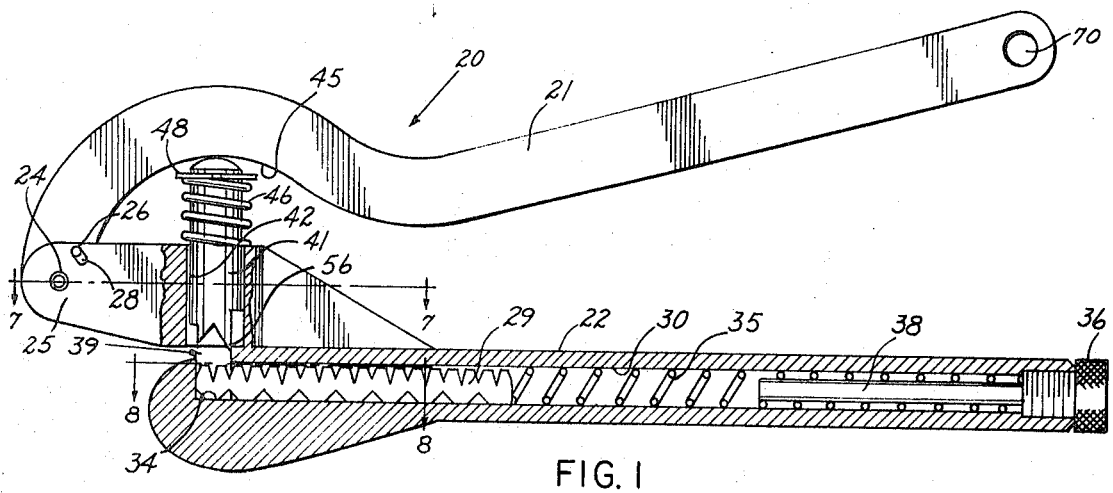
FIG. 1 is an elevation view, partly in section, of a tool embodying the present invention.
Figure 2:
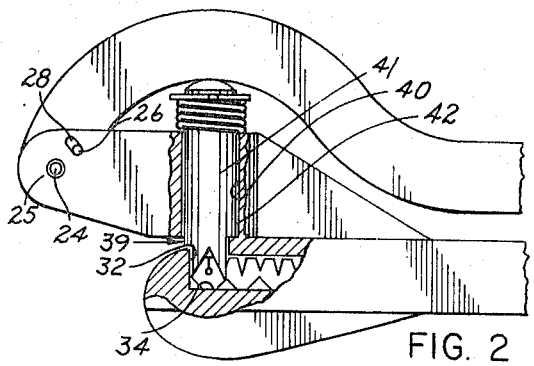
FIG. 2 is a fragmentary elevation view similar to FIG. 1 but with the tool shown in weight segment clamping and cutting position.
Figure 4:
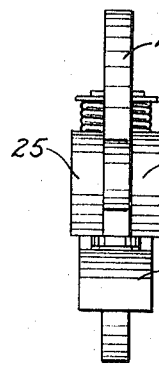
FIG. 4 is a front end elevation view of the tool shown in FIG. 1.
Figure 6:
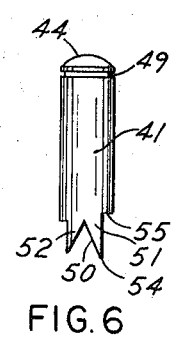
FIG. 6 is an elevation view of the cutting and clamping head utilized in the tool shown in FIG. 1.
Figure 5:
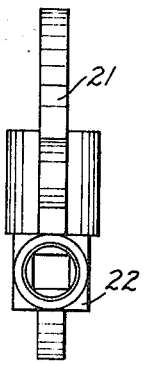
FIG. 5 is a rear end elevation view of the tool shown in FIG. 1.
Figure 3:
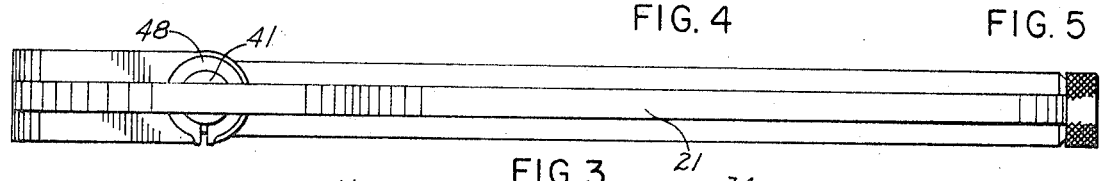
FIG. 3 is a top plan view of the tool shown in FIG. 1.
Figure 7:
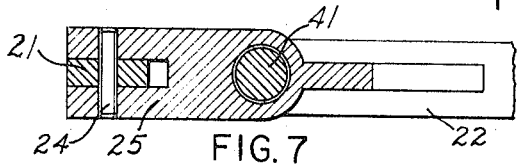
FIG. 7 is a section view taken substantially in the plane of line 7—7 on FIG. 1.
Figure 8:
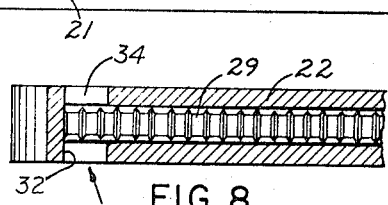
FIG. 8 is a section view taken substantially in the plane of line 8—8 on FIG. 1.
Figure 10:
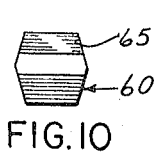
FIG. 10 is an end elevation view of the bar of sinker weight stock shown in FIG. 9.
Figure 9:
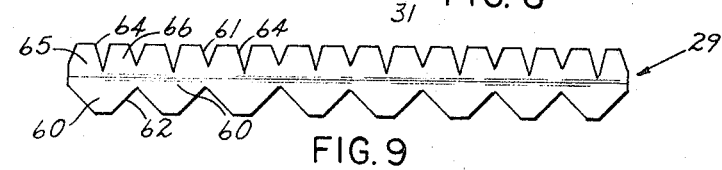
FIG. 9 is an elevation view of a bar of sinker weight stock formed of integrally joined weight segments.

Referring to the drawing, the tool there shown is adapted for attaching one or more sinker weights to a fishing line or the like. The weights and the method of attaching them to a fishing line are comparable to but an improvement over the use of conventional split shot for the same purpose. The tool embodying the invention may take a form somewhat similar to either a pair of pliers or a nutcracker; that is, it may constitute either a first class or a second class lever arrangement. The embodiment of the invention and form of tool shown in the drawing utilizes the nutcracker principle, that is a second class lever. Accordingly, the tool, indicated generally at 20, embodies a pair of handles 21, 22, corresponding ends of which are pivoted together by a pivot pin 24. The pivot pin may either be permanently riveted or may utilize a conventional nut and bolt or similar arrangement. The pivoted end of one of the handles 22 is enlarged to form a head, the end of which is bifurcated to define a pair of spaced ears 25 which pivotally receive an end of the other handle 21. The pivot pin 24 extends through the ears 25 and pivotally engages the end of the handle 21. In order to limit the opening movement between the two handles 21 and 22, one of the handles 21 includes a pin 26 which is positioned within a slot 28 defined within one or both of the ears 25. Any other suitable stop arrangement, such as corresponding shoulders or the like, may be utilized.

The tool is adapted to receive a strip or bar of sinker weight stock. One illustrative form of split sinker weight stock is shown in FIGS. 9 through 12 and will be described in more detail below. Suffice it to say at this point that the stock is an elongated strip or bar of soft metallic substance, such as lead, lead alloy or the like and is generally hexagonal, rectangular or ovoid in cross section. Other shapes will be suitable as indicated below. For receiving an elongated strip made up of split sinker weight segments, the tool handle 22 is provided with an internal, generally rectangular bore 30, adapted to receive the strip 29 of sinker weight stock. The bore is rectangular or non-circular in cross section in order to prevent the stock from turning or twisting, so that the split in the segment will always be positioned to receive a line. At an end of the handle 22 adjacent the pivot point 24, the bore 30 opens into a transverse slot 31. The slot 31 defines an end surface 32 and a lower transverse anvil surface 34, the latter being a continuation of the bottom surface of the internal bore 30.

For urging the bar stock 29 against the stop or end surface 32 in order to position a segment thereof over the anvil surface 34, an internal stock advancing spring 35 is provided within the bore. The loading end of the bore 30 is closed by a pivoted closure cap 36 threadably engaged with corresponding threads in the bore, and the cap is provided with a spring guide pin 38 which extends partially within the bore and into the spring 35.

The enlarged end or head of the handle 22 defines a throat 39 which opens into the transverse slot 31. Extending above the slot 31 and throat 39, the handle defines a bore 40 receiving a generally cylindrical clamping and cutting head 41. An internal bushing 42 may be provided to facilitate sliding movement of the head 41 within the bore 40. The clamping head 41 is provided with a rounded upper end 44 which engages with a cam surface 45 defined on the lower surface of the upper handle 21. A retraction compression spring 46 surrounds the head 41 when it is mounted in place in the bore 40 and this spring is held on the head 41 by a split ring clamp 48 which is engaged within a slot 49 on the head 41. As can be seen, by squeezing the handles 21, 22 together, the head 41 is forced inwardly within the bore 40, and the cutting and clamping end thereof is inserted into the slot 31 defined in the lower handle 22.

To provide a clamping and cutting action, the lower end of the head 41 is bifurcated to provide a generally V-shaped notch 50 defined by a pair of legs 51, 52, one of which is provided with a sharpened cutting edge 54. Intermediate its ends the cutting head defines a stop shoulder 55 which engages a corresponding stop shoulder 56 defined on the handle 41 adjacent the throat 39.

Figure 12:
FIG. 12 is a section view taken substantially in the plane of line 12—12 on FIG. 11.

One illustrative form of sinker weight stock for use in the above tool is shown in FIGS. 9 through 12. The stock 29 is an elongated soft metallic strip formed of lead, lead alloy or other sinker material which is easily shaped and is readily deformed in order to facilitate clamping it on to a fishing line. The bar stock as shown is generally hexagonal in cross section, although it may be rectangular or elliptical. The irregular shape is desirable in order to prevent the stock from turning within the tool bore 30. As can be seen from the drawing, the bar stock 29 is made up of a plurality of integrally joined segments of individual split sinker weights, indicated at 60. Individual ones of these weights are defined by upper and lower separation slots 61, 62 respectively. Each weight segment 60 is formed with a split or notch 64 for receiving a fishing line. The split 64 is defined by a pair of deformable jaws 65, 66 which can be squeezed together to clamp a fishing line within the split 64, as shown in FIG. 12. At the same time that the jaws 65, 66 are squeezed together, the segment 60 is severed from the bar stock by cutting between the notches 61 and 62. This clamping and cutting operation is accomplished by the head 41 of the tool. In this operation, the cutting edge 54 of one of the legs 51 defining the V-shaped notch 50 severs the bar stock by cutting through the material joining the separation slots 61, 62. At the same time, the sinker jaws 65, 66 are squeezed within the V-shaped slot 50 of the head 41 and press tightly together as shown in FIG. 12. During this clamping and cutting operation, the weight stock segment 60 is held tightly on the anvil surface 34 and against the stop surface 32 of the lower handle 22 of the tool. Each strip of weight stock includes an adequate sinker supply, preferably about eight to 10 segmental elements. The tool bore or magazine may be sufficiently sized in order to accommodate various sizes of weight stock bars. A variety of sizes is not generally required, however, as it is possible, with this tool, to quickly and easily attach a number of weight segments on the line.

Figure 11:
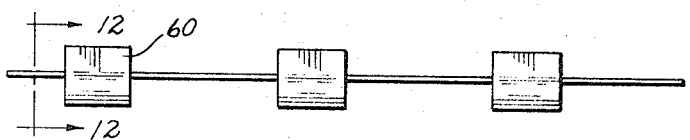
FIG. 11 is a top plan view of a series of shot weight segments attached to a fishing line by the tool shown in FIG. 1.

In operation, a bar of weight stock 29 is inserted within the bore 30 of the tool and the spring 35 and cap 36 inserted in place. The spring urges the first sinker segment on the bar stock against the stop shoulder 39 and in the slot 31. The tool is then ready for use. When desired, a fishing line is inserted through the tool throat 39 and positioned in the sinker split 64. The handles 21, 22 are squeezed together to cause the clamping and cutting head 41 to engage the exposed sinker segment. The cutting edge 54 on the head 41 severs the segment 60 from the remaining bar stock, and at the same time the jaws 65, 66 of the sinker are squeezed together to tightly clamp the fishing line within the split 64, as shown in FIGS. 11 and 12. The handles are then released, and the segment 60 can be easily slipped out of the slot and the line removed from the tool. Additional weights may be attached as desired and the line is ready for use. In operating the tool, the fisherman can readily actuate it with one hand while holding the line in position within the split 64 of a sinker segment with the other hand. There is no need to fumble for a single split to hold it in a pair of pliers and then endeavor to clamp the shot on to a fishing line while holding the line with one hand.

Those skilled in the art will be readily able to devise equivalent handle lever arrangements utilizing a cutting and clamping head similar to the one described above. Also, it is desirable in some instances to provide stiffening braces and fillets to strengthen the tool. The tool itself will be approximately the size of a conventional pair of pliers. An aperture 70 may be provided in one end of one handle so that the fisherman may attach the tool to his belt with an appropriate clip on a cord or chain so that the tool is always ready for use. It can also be seen that the tool can be readily actuated even though the fisherman may be wearing gloves or when the fisherman is standing in the middle of a stream or is in a spot where movement is restricted.

While a certain illustrative embodiment of the present invention has been shown in the drawing and described above in considerable detail, it should be understood that there is no intention to limit the invention to the specific forms of tool and sinker weight stock as shown and described. On the contrary, it is the intention to include alternative constructions, equivalents and uses which fall within the spirit and scope of the invention as expressed in the appended claims.

I claim as my invention:

1. A tool for attaching weights to a fishing line or the like comprising, a pair of handles pivoted together, a bifurcated clamping and cutting head adjacent one end of a first one of said handles, said head defining a generally V-shaped notch having opposed legs, one leg of said head defined by said notch having a sharpened cutting edge thereon, the second one of said handles having a transverse slot defined adjacent one end thereof for operative reception of said clamping and cutting head, said lot having a bottom wall forming an anvil surface and a side wall adjacent the end of said handle forming a stop surface, said second handle further having an elongated bore extending therethrough and opening into said slot at one end and having an access opening at the opposite end for receiving an elongated bar of sinker weight stock, said sinker weight stock embodying a plurality of split sinker weight segments integrally joined to form said elongated bar, each said sinker weight segment having a line receiving split defined therein, and means within said bore for feeding said sinker weight stock toward said slot to insert a segment thereof in said slot on said anvil surface and against said stop surface and position said segment for operative association within the V-shaped notch of said head, whereby cooperative actuation of said handles drives said head into clamping and cutting engagement with said sinker weight segment thereby to sever the same from said stock and simultaneously clamp the same tightly on to a line positioned in the split thereof.

2. A tool for attaching weights to a fishing line or the like comprising a pair of handles pivoted together, a bifurcated clamping and cutting head adjacent one end of a first one of said handle, said head defining a generally V-shaped notch having opposed legs, one leg of said head defined by said notch having a sharpened cutting edge thereon, the second one of said handles having a transverse slot defined adjacent one end thereof for operative reception of the clamping and cutting head, said second handle further having an elongated bore extending therethrough and opening into said slot at one end and having an access opening at the opposite end for receiving an elongated bar of sinker weight stock embodying a plurality of split sinker weight segments, whereby cooperative actuation of said handles drives said head into clamping and cutting engagement with one segment of said sinker weight stock thereby to sever the same from said stock and simultaneously clamp the same tightly on to a line positioned in the split thereof.

* * * * *